United States Patent
Mies

(10) Patent No.: US 7,377,599 B2
(45) Date of Patent: May 27, 2008

(54) BRAKE SYSTEM

(75) Inventor: Hubertus Mies, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 90 days.

(21) Appl. No.: 10/510,205

(22) PCT Filed: Jan. 27, 2003

(86) PCT No.: PCT/DE03/00208

§ 371 (c)(1),
(2), (4) Date: Nov. 19, 2004

(87) PCT Pub. No.: WO03/089283

PCT Pub. Date: Oct. 30, 2003

(65) Prior Publication Data

US 2005/0173976 A1    Aug. 11, 2005

(30) Foreign Application Priority Data

Apr. 19, 2002  (DE)  ................................ 102 17 631

(51) Int. Cl.
*B60T 13/74* (2006.01)
(52) U.S. Cl. ............................................ 303/3; 303/15
(58) Field of Classification Search .................. 303/10, 303/11, 3, 15, 71, 20, 85; 60/435, 436
See application file for complete search history.

(56) References Cited

U.S. PATENT DOCUMENTS 5,281,007 A    1/1994    Brainard

FOREIGN PATENT DOCUMENTS

| DE | 38 23 108 A1 | 3/1989 |
| DE | 43 22 634 C2 | 1/1995 |
| EP | 1 201 523 A2 | 5/2002 |
| JP | A 9-142271 | 6/1997 |
| WO | WO 01/30625 A1 | 5/2001 |

OTHER PUBLICATIONS

RD 66 144/03.95; 1-Kreis-Fremdkraftbremsventil Typ LT 05, Serie 2X, Mannesmann Rexroth, pp. 5-7. Was published at least prior to the date of Apr. 19, 2002.
RD 66 146/03.95; 2-Kreis-Fremdkraftbremsventil Typ LT 07; Serie 2X, Mannesmann Rexroth, pp. 8-10. Was published at least prior to the date of Apr. 19, 2002.

*Primary Examiner*—Melanie Torres
(74) *Attorney, Agent, or Firm*—Oliff & Berridge, PLC

(57) ABSTRACT

A brake system for a mobile work tool, such as for a logging machine or a combined dredger-loader, is disclosed. The mobile work tool is provided with two non-muscular brake valves for brake actuation which may be operated by the driver in accordance with the orientation in the driver's cab—for instance during road travel and when the driver's direction of view is to the rear. In accordance with the invention, a tank port of a non-muscular brake valve is connected with the brake port of the second non-muscular brake valve, so that the first non-muscular brake valve is connected via the tank port of the second non-muscular brake valve with the pressure medium tank, and upon actuation of the second non-muscular brake valve the generated braking pressure is supplied via the tank port of the first non-muscular brake valve into the latter, so that the brake ports thereof are correspondingly subjected to braking pressure.

15 Claims, 4 Drawing Sheets

BRAKE SYSTEM

The invention relates to a brake system for a mobile work tool in accordance with the preamble of claim 1.

The like brake systems are employed in heavy-duty vehicles in civil engineering, agriculture and forestry, as well as with special-purpose vehicles, and must have a high degree of operational safety at low operating forces.

The named vehicles, such as logging machines or combined dredger-loaders, are designed with a swivelling driver's seat which, on the one hand, is oriented in the forward direction of normal travelling, and in working operation is rotated "rearwards" by 180 degrees. In this work position, the driver operates work tools arranged at the rear side of the vehicle, wherein the travelling mechanism and the brake system of the vehicle still have to be operated. Corresponding to these two operating conditions, the above mentioned vehicles are designed with one respective brake pedal for "forward travel" (mostly road travel, timber transport, etc.) and for "rear travel" (logging, etc.), whereby a respective non-muscular brake valve for controlling the wheel brake cylinders may be operated.

In the hitherto known solutions, upon actuation of the brake pedal provided for "rear travel", a pilot pressure is generated which generates a corresponding braking pressure for controlling the wheel brake cylinders on the non-muscular brake valve provided for "forward travel." Accordingly, the main non-muscular brake valve provided for forward travel must be provided with a pilot port through which the pilot pressure generated by the secondary non-muscular brake valve (rear travel) may be tapped and applied to a control surface of a control piston acting in the direction of brake engagement. Such a non-muscular brake valve with pilot port as known, e.g., from JP 9142271, is furnished as a specially executed valve only and is correspondingly costly.

In contrast, the invention is based on the objective of furnishing a brake system for a mobile work tool, wherein the expenditure in terms of apparatus technology is minimum in comparison with the conventional solutions.

This objective is achieved through a brake system for a mobile work tool having the combination of features of claim 1.

In accordance with the invention, the brake system includes a main non-muscular brake valve (hereinafter referred to as main brake valve) associated with "forward travel" (road travel) and a secondary non-muscular brake valve (hereinafter referred to as secondary brake valve) associated with "rear travel" (logging, etc.), wherein a tank port of the main brake valve is connected with the brake port of the secondary brake valve. Namely, in the basic position of the main brake valve, the brake port thereof is connected with the tank via the secondary brake valve. Upon actuation of the secondary brake valve, the braking pressure generated at the brake port of the secondary brake valve is present at the tank port of the non-actuated main brake valve, so that this braking pressure is also present at the brake port(s) of the main brake valve via the tank port, so that the wheel brake cylinders can be actuated.

This construction allows to realize the brake system of the invention with standard valves, so that a substantially more economical solution having a substantially more simple construction is possible than with the conventional brake systems that include specially executed valves.

In accordance with the invention, the main brake valve includes control pistons that are biased via a control spring assembly accommodated in a spring chamber. In one variant of the main brake valve, this spring chamber is connected to the tank port, and in another, alternative variant to atmosphere. In the former alternative, it is possible upon simultaneous actuation of both brake valves to build up a braking pressure that is higher than the respective braking pressure applied through the intermediary of the brake valves, whereas in the second alternative the higher one of the two braking pressures is passed through.

In a particularly preferred variant of the brake system, the main brake valve is designed with a high-pressure seal, so that leakages can not occur even when high braking pressures are present at the tank port.

In accordance with the invention, it is preferred if the main brake valve has the form of a dual circuit valve, and the secondary brake valve associated with rear travel has the form of a single-circuit non-muscular brake valve.

In an advantageous variant, the operating elements of the two brake valves have the form of pedals.

Further advantageous developments of the invention are subject matters of the further subclaims.

In the following, a preferred embodiment of the invention shall be explained in more detail by referring to schematic drawings, wherein.

Figure 1:
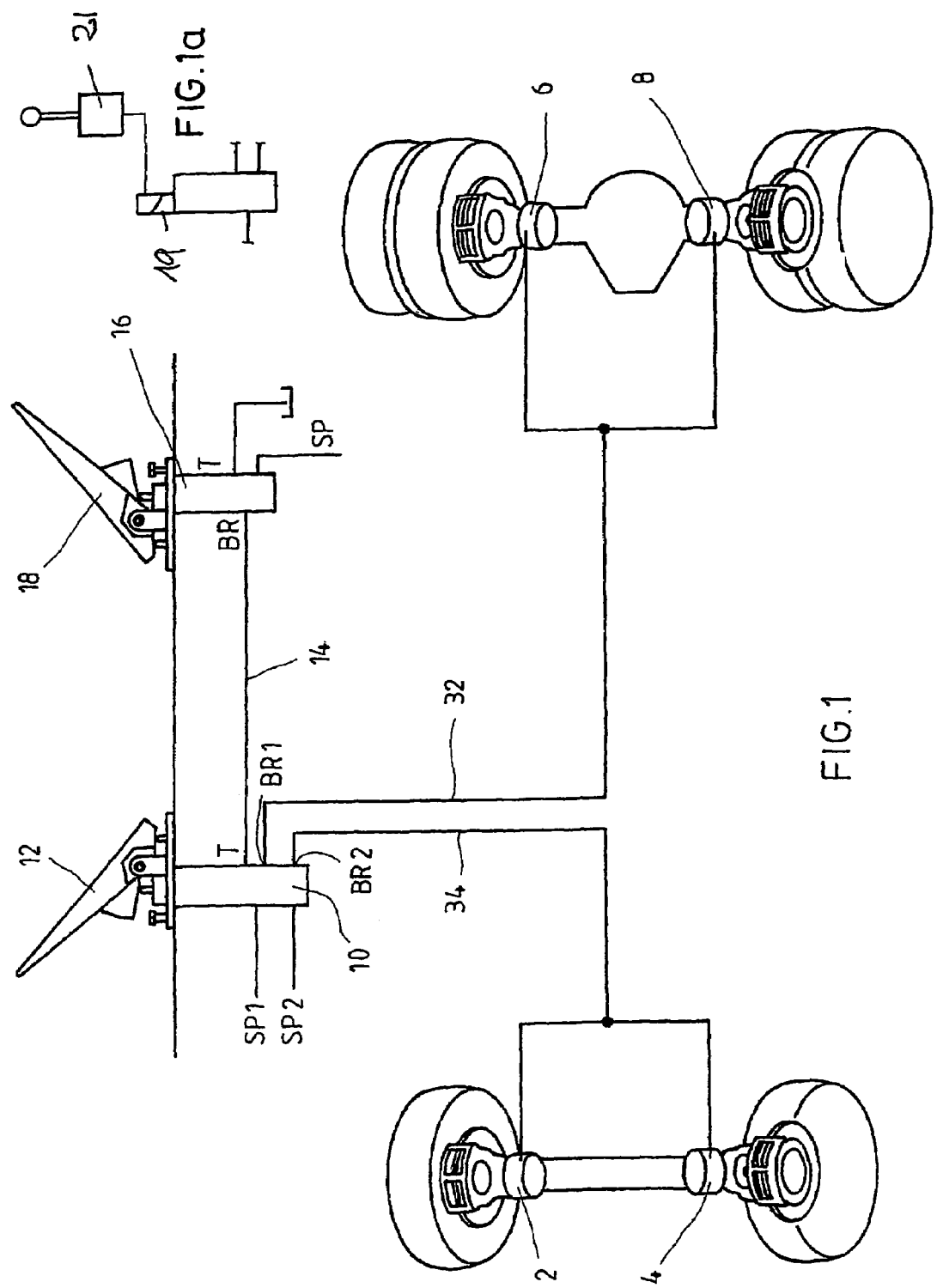
FIG. 1 shows a principle drawing of a brake system for a mobile work tool.

FIG. 1 shows a highly schematic representation of a brake system 1 of a logging machine or of a combined dredger-loader. The vehicle has four wheel brake cylinders 2, 4, 6, 8 that act on respective wheel brakes and may be controlled hydraulically through the intermediary of a dual circuit brake system. Control of the wheel brake cylinders 2, 4, 6, 8 is achieved through a dual circuit non-muscular brake valve, in the following referred to as main brake valve 10. It includes two brake ports BR1, BR2, whereby the wheel brake cylinders 6, 8 associated with the rear axle and the wheel brake cylinders 2, 4 associated with the front axle may be subjected to a braking pressure. The main valve 10 moreover includes two reservoir ports SP1, SP2 connected with hydraulic accumulators. The main brake valve 10 additionally includes two ports for braking pressure return, which are not shown in the representation in accordance with FIG. 1. Actuation of the main brake valve 10 is achieved through the intermediary of a pedal 12 arranged in the direction of "forward travel", whereby control pistons of the main brake valve 10 may be actuated.

In accordance with FIG. 1, a tank port T of the main brake valve 10 is connected via a connecting line 14 with a brake port BR of a secondary non-muscular brake valve, hereinafter referred to as secondary brake valve 16. The latter has a tank port T as well as a reservoir port SP connected with the hydraulic accumulator(s), and is actuated through the intermediary of an additional pedal 18. Both the main brake valve 10 and the secondary brake valve 16 essentially are standard components as represented, e.g., in data sheets RD 60 146 (Type LT07) and RD 66 144 (Type LT05) as distributed by the applicant. The additional pedal 18 is oriented in the direction of "rear travel" of the vehicle and is reached from the "forward travel" position by swivelling the driver's seat through 180 degrees.

In the represented basic position, i.e., when the pedals 12, 18 are not actuated, the brake port BR of the secondary brake valve 16 is connected with the tank port T. The two brake ports BR1 and BR2 of the main brake valve 10 are also connected, via its tank port T, the connecting line 14 and the brake port BR of the secondary brake valve 16, with the tank port leading to the pressure medium tank T.

As is represented in FIG. 1a, for operating the brake valves 10, 16 it is also possible to use, instead of the pedals 12, 18 or similar mechanical means, respective proportional magnets 19 that are controlled, e.g., through a joystick 21.

Figure 2:
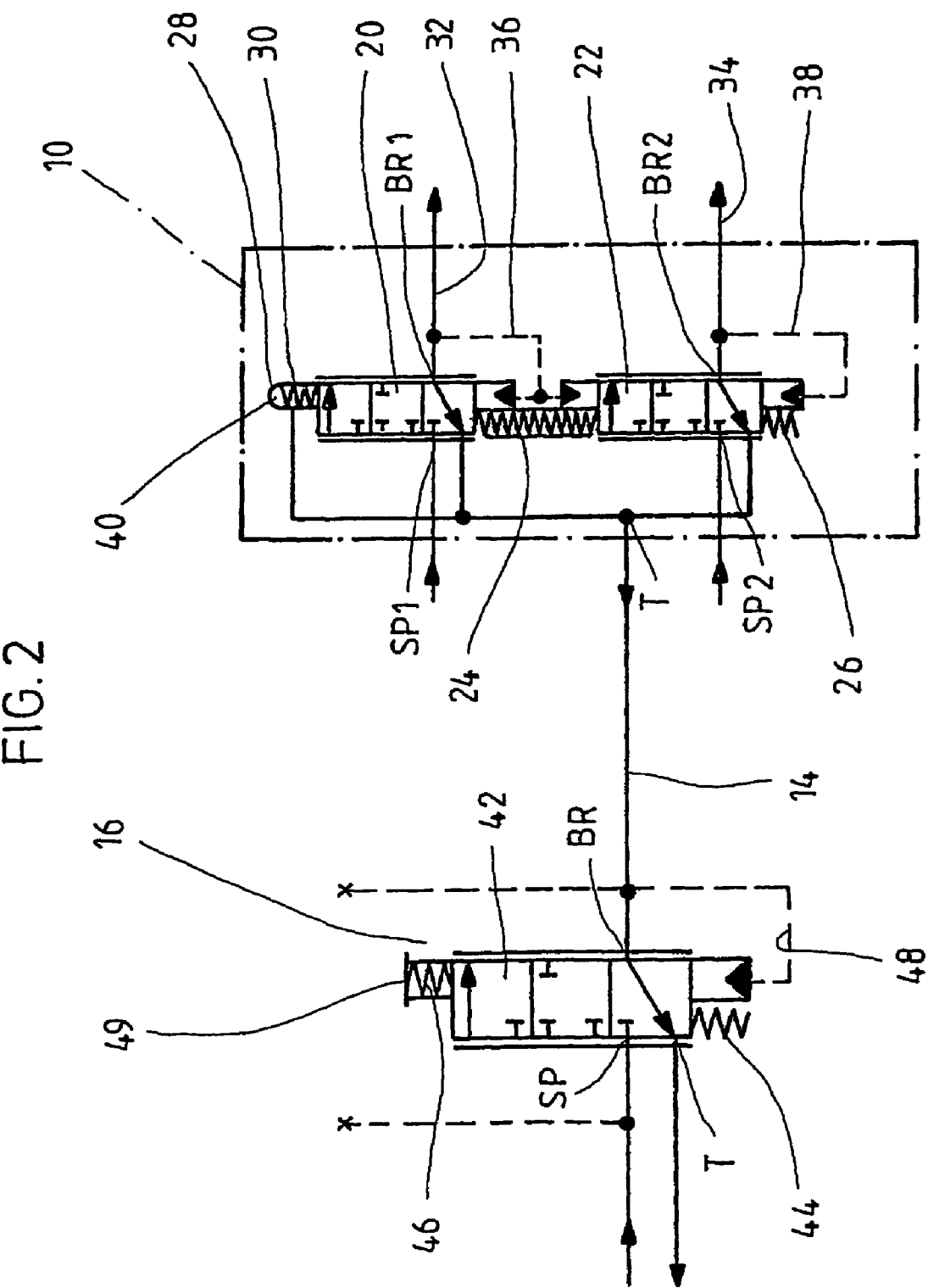
FIG. 2 shows a circuit diagram of a main non-muscular brake valve and of a secondary non-muscular brake valve of the brake system of FIG. 1.

Further details of the brake system 1 become evident from the representation in accordance with FIG. 2, where the circuit diagrams of the main brake valve 10 and of the secondary brake valve 16 are represented.

The two brake valves 10, 16 basically are pressure reducing valves whereby a braking pressure developing in proportion with the stroke of pedals 12, 18 may be set.

The main brake valve 10, which is designed as a dual circuit valve, has two continuously variable control pistons 20, 22 that are in mechanical operative connection. Between the two pistons there extends a reset spring 24 which pushes the two control pistons 20, 22 apart. In the opposite direction, the two control pistons 20, 22 may be taken into a stop position.

The lower (FIG. 2) control piston 22 is acted on by a pressure spring 26 towards the upper control piston 20. The axial displacement of the two control pistons 20, 22 takes place via a tappet 28 acting on the control piston 20 via a control spring means 30. The displacement of the tappet 28 is obtained via the pivotable pedal 12 represented in FIG. 1.

In the represented basic position of the control pistons 20, 22, the two reservoir ports SP1 and SP2 are blocked, whereas the two brake ports BR1, BR2 are connected with the tank port T.

The pressure present in the brake line 32 that is connected to the brake port BR1, is tapped via a control line 36 and is present at a respective control chamber, whereby the two control pistons 20, 22 are acted on in the direction of the force of the reset spring 24.

From the lower brake line 34 another control line 38 branches off, through which the braking pressure present at the brake port BR2 is tapped and signalled to a control chamber associated with the control piston 22 and acting in the direction towards the pressure spring 26.

When the pedal 12 is depressed, the tappet 28 is moved in a downwardly direction in the representation in accordance with FIG. 2, so that the control piston 20 is displaced accordingly. It contacts the control piston 22, so that the latter is also moved downwardly. As a result of this axial displacement of the control pistons 20, 22, initially the respective tank ports T are blocked, and then the connection between the brake ports BR1, BR2 and SP1 or SP2 is opened. The pressure in the brake lines 32, 34 is tapped via the control lines 36, 38, so that the control pistons 20, 22 assume a control position in which the pressure controlled in the brake lines 34, 36 is constant while the displacement of the brake pedal 18 is kept constant. The actuation force of the pedal 12 is proportional to its displacement, so that the driver receives good feedback concerning the braking force set by him. The spring chamber 40 of the main brake valve that accommodates the control spring assembly 30 is connected with the tank port T.

When the pedal 18 is released, the control pistons 20, 22 return into their represented home positions as a result of the force of the pressure spring 26 and of the reset spring 24, and of the control pressures acting in addition.

In this home position, the two brake lines 32, 34 are connected via the brake ports BR1 and BR2, respectively, with the tank port T, so that the pressure medium flows via the connecting line 14 to the brake port BR of the secondary brake valve 16.

The secondary brake valve 16 includes a spool valve 42 that may be subjected to the force of a spring 44 on the one hand, and on the other hand to an actuation force via a control spring means 46 and a tappet 49 that is connected with the pedal 18. The pressure present in the connecting line 14 is tapped via a control passage 48 and is present at an end face of the spool valve 42 that acts in the direction of the spring 44.

In its spring-biased basic position, the spool valve 42 connects the brake port BR with the tank port T, so that the brake ports BR1 and BR2 of the main brake valve 10 are also connected with the pressure medium tank via the tank port T thereof, the connecting line 14, the brake port BR of the secondary brake valve 16 and the tank port T thereof.

When the pedal 18 is actuated, the tappet 49 is moved downwardly (view of FIG. 2), so that the spool valve 42 is displaced downwardly by the force of the control spring means 46. As a result of this axial displacement of the spool valve 42, initially the tank port T is blocked, and subsequently the connection between the reservoir port SP and the brake port BR is opened. The braking pressure 48 generated at the brake port BR is tapped via the control passage 48 and is present at the rear side of the control spool valve 42. The pressurized pressure medium flows via the connecting line 14, the tank port T of the main brake valve 10 (which is in the represented basic position), and the two brake ports BR1 and BR2 into the two respective brake lines 32 and 34, so that the wheel brake cylinders 2, 4 and 6, 8 of the two brake circuits are actuated. With a constant displacement of the pedal 18, the spool valve 42 is adjusted—as a function of the braking pressure acting on its rear side and the forces applied by the control spring means 46 and the spring 44—into a control position in which the braking pressure adjusted in the brake lines 32, 34 is kept constant.

The invention is characterized by extremely simple construction in connection with reliable function. One problem of the solution according to the invention is the fact that upon actuation of the pedal 18 and build-up of a corresponding braking pressure, this braking pressure is present at the tank port T and thus in the spring chamber 40 of the main brake valve 10. It is therefore necessary to take particular precautions so as to protect this range against leakage.

Figure 3:
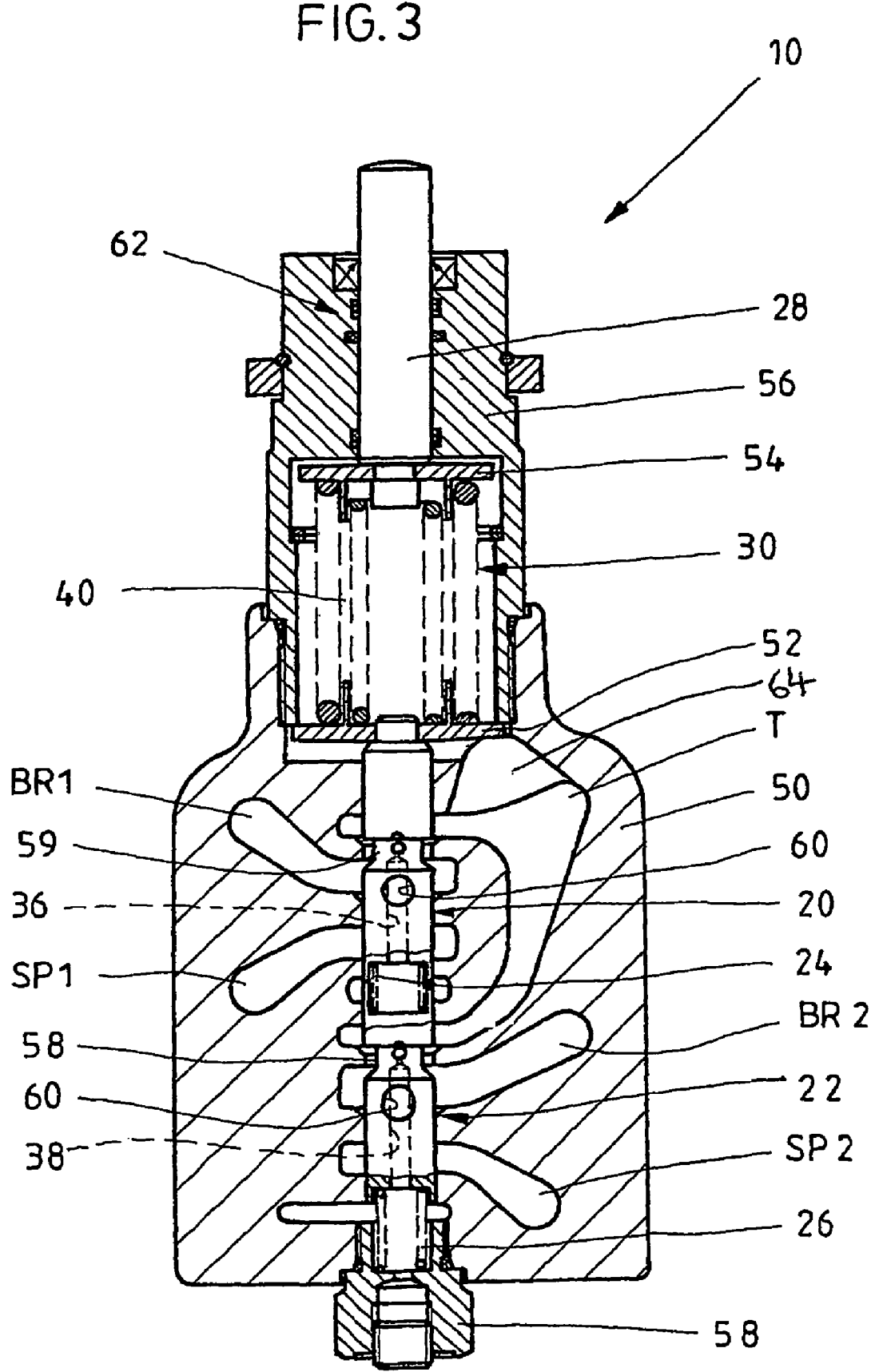
FIG. 3 shows a sectional view of a main non-muscular brake valve in accordance with FIG. 2.

FIG. 3 shows a sectional view of the main brake valve 10. As was already mentioned, this is—apart from the seals—a standard component that is known per se, so that in the following only the essential components of this main brake valve 10 shall be described. It has a valve housing 50 on which the brake ports BR1, BR2, the reservoir ports SP1, SP2, and the tank port T as well as the above mentioned braking pressure return lines (not shown) are formed. The two control piston 20, 22 which are in mutual contact in the represented basic position, and between which the reset spring 24 is arranged, are guided in the valve housing 50.

The upper end face portion of the control pistons 20 in the representation of FIG. 3 plunges into the spring chamber 40 defined by an insert 56 and by the valve housing 50. On this end portion of the control piston 20 a spring cup 52 is mounted at which the control spring assembly 30 attacks. The latter is supported via another spring cup 54 on the tappet 28 which may be actuated by means of the pedal 12 and is guided in the insert 56.

The lower end face of the control piston 22 in the representation of FIG. 3 is acted on by the pressure spring 26 which is supported on a closure screw 58. The control lines 36, 38 are in the represented variant formed by angled bores of the control pistons 20 and 22, respectively.

The control lands for closing the tank port T and for opening the connection between the brake ports BR1, BR2 and SP1 and SP2 are formed, in a manner known per se, by annular grooves 59 or radial recesses 60 of the control pistons 20, 22 (in this regard cf., e.g., DE 43 22 634 C2).

As was mentioned above, upon actuation of the pedal 18 the braking pressure supplied through the connecting line 14 is present in the spring chamber 40, so that in particular the sealing assembly 62 between the axially displaceable tappet 28 and the insert 56 is exposed to high static and dynamic stresses. Accordingly, in the solution of the invention, high-pressure seals instead of the low-pressure seals customarily employed in this field are used particularly for the sealing assembly and optionally any seals subject to high strains in order to avoid leakages. I.e., the main brake valve 10 represented in FIG. 3 essentially differs from the standard dual circuit non-muscular brake valve represented in data sheet RD 66 146 in that instead of low-pressure seals, high-pressure seals having a per se known construction are employed in the pressure chambers connected with the tank port.

In the above described structure, the pressure prevailing at the tank port T is present in the spring chamber 40 of the valve 10. If only the main brake valve 10 is actuated, the spring chamber is relived of pressure, and a braking pressure is built up in the degree in which the control spring 30 is compressed. If only the secondary brake valve 16 is actuated, then the braking pressure becomes as high as the pressure adjusted into the tank port of the brake valve 10. Upon simultaneous actuation of both brake valves 10, 16, the spring force (control spring 30) and the pressure adjusted into the tank port T act on the control piston 20, 22 of the main brake valve 10 in the direction of the braking pressure build-up, so that with correspondingly charged accumulators, a higher braking pressure may be built up than with sole actuation of the brake valves 10, 16. Particularly with use of a joystick (FIG. 1a), a maximum pressure may then be applied under particular operating situations.

Figure 4:
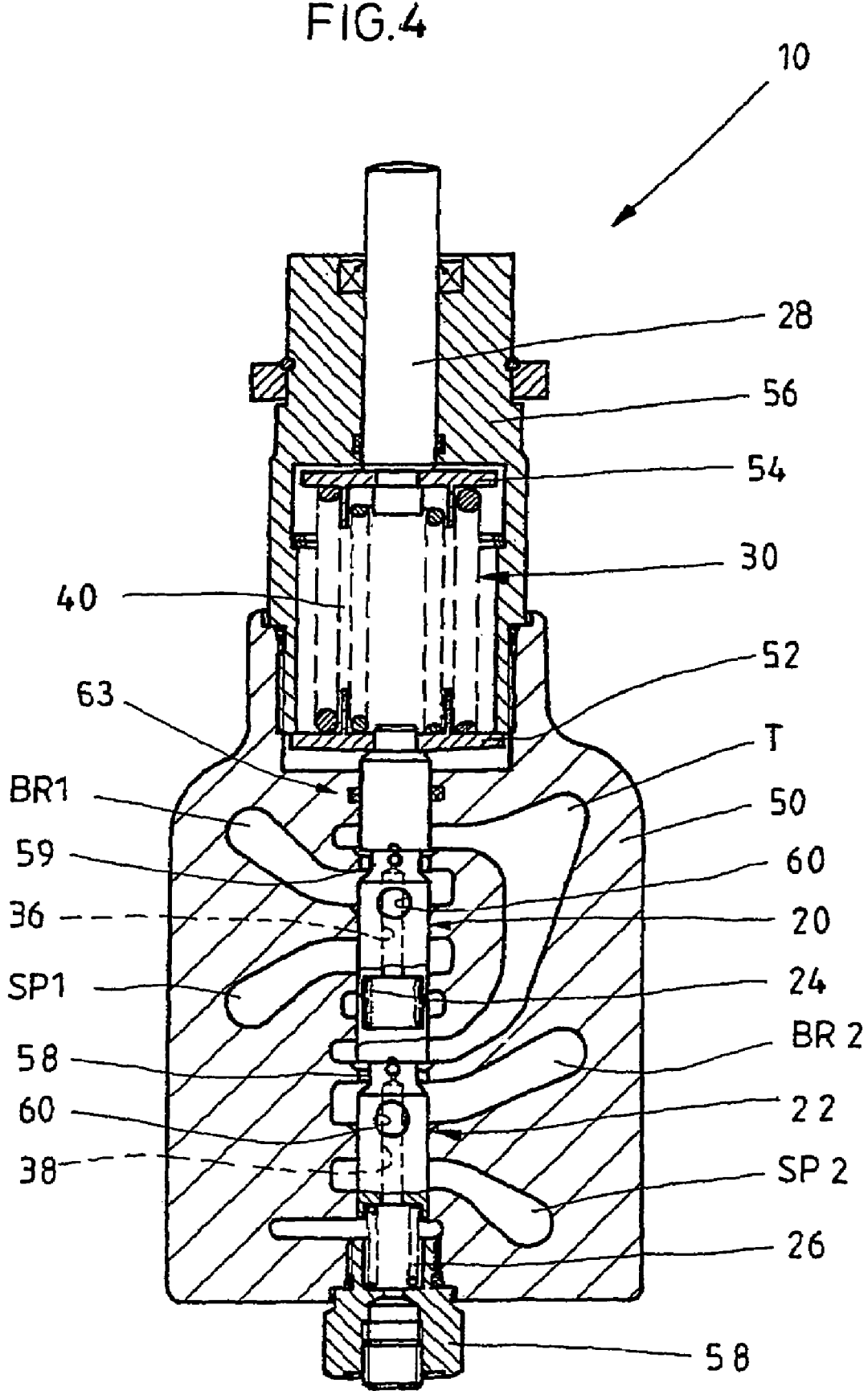
FIG. 4 shows a variant of the main brake valve in accordance with FIG. 3.

In the above described embodiment in accordance with FIG. 3, the tank port T is connected via a connection passage 64 with the spring chamber 40, so that the pistons 30 are subjected to the pressure at the tank port T in the direction of braking pressure build-up, so that the above described increased braking pressure may be applied. In FIG. 4 a variant is represented in which the tank port 40 is hydraulically separated from the tank port T. In this variant a high-pressure seal 63 encompassing the control piston 20 is arranged in the section where the valve bore receiving the control pistons 20, 22 is incorporated into the spring chamber 40, and the connection passage 64 is closed, so that the spring chamber 40 is connected not with the tank port but with atmosphere. If, now, in this variant both brake valves 10, 16 are actuated simultaneously, this does not result in an increase of braking pressure as in the above described embodiment, but the higher one of the two braking pressures built up via the brake valves 10, 16 is passed through. Upon actuation of the main brake valve 10, or of the secondary brake valve 16, respectively, the same braking pressure manifests as in the above described embodiment in accordance with FIG. 3. In other words, in the embodiment represented in FIG. 4, the maximum braking pressure is limited to the maximum braking pressure that may be adjusted via the brake valves 10, 16, whereas in the embodiment in accordance with FIG. 3 a higher braking pressure may be built up. Accordingly, in the case of the embodiment in accordance with FIG. 3, it is necessary to install a seal that sustains higher pressures than the high-pressure seal 63 in the embodiment in accordance with FIG. 4. Thus it may be sufficient, e.g., to provide a high-pressure seal equipped with a support ring for the embodiment in accordance with FIG. 4, which is designed for a maximum pressure of 110 bar, whereas in the case of the embodiment in accordance with FIG. 3 a seal having a substantially higher maximum pressure of, say, 250 bar is used.

The secondary brake valve 16 is a standard component which does not require any essential modifications even with regard to the seals, so that a detailed description thereof may be omitted.

A brake system for a mobile work tool, such as for a logging machine or a combined dredger-loader, is disclosed. The mobile work tool is provided with two non-muscular brake valves for brake actuation which may be operated by the driver in accordance with the orientation in the driver's cab—for instance during road travel and when the driver's direction of view is to the rear. In accordance with the invention, a tank port of a non-muscular brake valve is connected with the brake port of the second non-muscular brake valve, so that the first non-muscular brake valve is connected via the tank port of the second non-muscular brake valve with the pressure medium tank, and upon actuation of the second non-muscular brake valve the generated braking pressure is supplied via the tank port of the first non-muscular brake valve into the latter, so that the brake ports thereof are correspondingly subjected to braking pressure.

LIST OF REFERENCE NUMERALS 1 brake system
2 wheel brake cylinder
4 wheel brake cylinder
6 wheel brake cylinder
8 wheel brake cylinder
10 main brake valve
12 pedal
14 connecting line
16 secondary brake valve
18 additional pedal
19 proportional magnet
20 control piston
21 joystick
22 control piston
24 reset spring
26 pressure spring
28 tappet
30 control spring assembly
32 brake line
34 brake line
36 control line
38 control line
40 spring chamber
42 spool valve
44 spring
46 control spring means
48 control passage
49 tappet
50 valve housing
52 spring cup
54 additional spring cup 56 insert
58 closure screw
59 annular groove
60 radial recess
62 sealing assembly
63 high-pressure seal
64 connection passage

The invention claimed is:

1. Brake system for a mobile work tool, wherein a first main non-muscular brake valve for actuating a service brake and a second secondary non-muscular brake valve for actuating this service brake are provided, each brake valve having at least a tank port, a reservoir port for a hydraulic accumulator, and a brake port leading to the service brake, wherein the tank port of the main non-muscular brake valve is connected with the brake port of the secondary non-muscular brake valve and wherein the brake valves for braking the mobile work tool are individually operable by the driver of the mobile work tool.

2. Brake system in accordance with claim 1, wherein each non-muscular brake valve has at least one control piston that connects the respective tank port with the brake port and blocks the reservoir port when in its basic position, and which may be displaced through the intermediary of an operating element and a control spring assembly, so that the connection to the tank port is blocked and the connection between the reservoir port and the brake port is opened, with a spring chamber of the control spring assembly of the main non-muscular brake valve being connected with the tank port thereof, and the operating element plunging into the spring chamber being sealed by means of a high-pressure seal.

3. Brake system in accordance with claim 1, wherein each non-muscular brake valve has at least one control piston which connects the respective tank port with the brake port and blocks the reservoir port when in its basic position, and which may be displaced through the intermediary of an operating element and a control spring assembly, so that the connection towards the tank port is blocked, and the connection between the reservoir port and the brake port is opened, wherein a spring chamber of the control spring assembly of the main non-muscular brake valve is connected to atmosphere, and wherein a valve bore accommodating the control piston is sealed against the spring chamber through a high-pressure seal.

4. Brake system in accordance with claim 1, wherein the main non-muscular brake valve has the form of a dual circuit brake valve, and the secondary non-muscular brake valve has the form of a single-circuit brake valve.

5. Brake system in accordance with claim 1, wherein the main non-muscular brake valve has the form of a road travel brake valve, and the secondary non-muscular brake valve has the form of a work brake valve.

6. Brake system in accordance with claim 1, wherein the operating element is adapted to be operated through a pedal or a proportional magnet, respectively.

7. Brake system in accordance with claim 2, wherein the main non-muscular brake valve has the form of a dual circuit brake valve, and the secondary non-muscular brake valve has the form of a single-circuit brake valve.

8. Brake system in accordance with claim 3, wherein the main non-muscular brake valve has the form of a dual circuit brake valve, and the secondary non-muscular brake valve has the form of a single-circuit brake valve.

9. Brake system in accordance with claim 2, wherein the main non-muscular brake valve has the form of a road travel brake valve, and the secondary non-muscular brake valve has the form of a work brake valve.

10. Brake system in accordance with claim 3, wherein the main non-muscular brake valve has the form of a road travel brake valve, and the secondary non-muscular brake valve has the form of a work brake valve.

11. Brake system in accordance with claim 4, wherein the main non-muscular brake valve has the form of a road travel brake valve, and the secondary non-muscular brake valve has the form of a work brake valve.

12. Brake system in accordance with claim 2, wherein the operating element is adapted to be operated through a pedal or a proportional magnet, respectively.

13. Brake system in accordance with claim 3, wherein the operating element is adapted to be operated through a pedal or a proportional magnet, respectively.

14. Brake system in accordance with claim 4, wherein an operating element is adapted to be operated through a pedal or a proportional magnet, respectively.

15. Brake system in accordance with claim 5, wherein an operating element is adapted to be operated through a pedal or a proportional magnet, respectively.

* * * * *